(12) United States Patent
Kondo

(10) Patent No.: US 8,810,101 B2
(45) Date of Patent: Aug. 19, 2014

(54) ELECTRIC ROTARY MACHINE HAVING CLAW MAGNETIC POLES WITH FLANGES HAVING CENTRIFUGAL FORCE RESISTANCE

(75) Inventor: Koji Kondo, Kiyosu (JP)

(73) Assignee: Denso Corporation, Kariya (JP)

( * ) Notice: Subject to any disclaimer, the term of this patent is extended or adjusted under 35 U.S.C. 154(b) by 585 days.

(21) Appl. No.: 12/458,711

(22) Filed: Jul. 21, 2009

(65) Prior Publication Data

US 2010/0026130 A1 Feb. 4, 2010

(30) Foreign Application Priority Data

Jul. 29, 2008 (JP) ................................ 2008-194252

(51) Int. Cl.
*H02K 1/27* (2006.01)
(52) U.S. Cl.
USPC ................. 310/156.72; 310/156.71; 310/263
(58) Field of Classification Search
USPC .................... 310/156.71, 156.72, 156.73, 263
IPC .............................................. H02K 1/27,19/22
See application file for complete search history.

(56) References Cited

U.S. PATENT DOCUMENTS

| | | | | |
|---|---|---|---|---|
| 3,004,181 | A * | 10/1961 | Noddin | 310/263 |
| 5,483,116 | A * | 1/1996 | Kusase et al. | 310/263 |
| 5,578,885 | A * | 11/1996 | Alford et al. | 310/263 |
| 5,825,116 | A | 10/1998 | Ishikawa | |
| 6,144,138 | A * | 11/2000 | Ragaly | 310/263 |
| 6,201,335 | B1 * | 3/2001 | Higashino et al. | 310/263 |
| 6,897,597 | B1 * | 5/2005 | Armiroli et al. | 310/263 |
| 2002/0011757 | A1 | 1/2002 | Tanaka et al. | |
| 2002/0117934 | A1 * | 8/2002 | Kanazawa et al. | 310/263 |
| 2004/0205955 | A1 | 10/2004 | Kawai et al. | |
| 2008/0030095 | A1 * | 2/2008 | Iizuka et al. | 310/156.43 |

FOREIGN PATENT DOCUMENTS

| | | |
|---|---|---|
| JP | A 9-131030 | 5/1997 |
| JP | A-10-136623 | 5/1998 |
| JP | A-2002-044921 | 2/2002 |
| JP | A 2002-262530 | 9/2002 |
| JP | A-2004-320887 | 11/2004 |

OTHER PUBLICATIONS

Office Action issued in Japanese Patent Application No. 2008-194252, on Jul. 27, 2010 (with translation).
Notification of Reasons for Rejection dated Feb. 1, 2011 in corresponding Japanese Patent Application No. 2008-194252 (with translation).

* cited by examiner

*Primary Examiner* — Michael Andrews
(74) *Attorney, Agent, or Firm* — Oliff PLC

(57) ABSTRACT

An AC alternator for a vehicle has a rotor having a pair of pole cores, and a stator. A plurality of claw magnetic pole parts are formed in the pole cores. A permanent magnet is placed between a pair of the claw magnetic pole parts so as to prevent leakage of magnetic flux through the area between the adjacent claw magnetic pole parts. The stator and the rotor are placed in the AC alternator so that the stator faces the rotor at a spacing of predetermined intervals. Flanges are formed at both sides of each of the claw magnetic pole parts. The presence of the flanges fixes the permanent magnets to the pole cores, and prevents them from moving toward the outer radius direction measured from the rotary shaft of the rotor. In particular, the thickness of each of the flange parts is increased from the front end part to the bottom part thereof.

7 Claims, 3 Drawing Sheets

US 8,810,101 B2

ELECTRIC ROTARY MACHINE HAVING CLAW MAGNETIC POLES WITH FLANGES HAVING CENTRIFUGAL FORCE RESISTANCE

CROSS-REFERENCE TO RELATED APPLICATION

This application is related to and claims priority from Japanese Patent Application No. 2008-194252 filed on Jul. 29, 2008, the contents of which are hereby incorporated by reference.

BACKGROUND OF THE INVENTION

1. Field of the Invention

The present invention relates to an electric rotary machine for vehicles such as passenger cars and trucks, in particular to an electric rotary machine having an improved rotor structure comprised of permanent magnets and pole cores with claw magnetic pole parts.

2. Description of the Related Art

Various types of electric rotary machines are mounted to vehicles. For example, Japanese patent laid open publication NO. JP H09-131030 has disclosed an alternate current (AC) generator or a vehicular alternator for a vehicle. The conventional AC generator has permanent magnets placed between adjacent claw magnetic pole parts. The claw magnetic pole parts are annularity arranged on the outer peripheral surface of a Lundell type rotor. The claw magnetic pole parts are alternately faced to each other. The structural combination of the claw magnetic pole parts and the permanent magnets prevents leakage of magnet flux from the area between the adjacent claw magnetic pole parts, and thereby increases the amount of effective magnet flux.

In addition, a flange part is formed at the outer periphery of each of the claw magnetic pole parts in the Lundell type rotor in the AC generator having the above structure in order to fix the permanent magnets in the diameter direction of the rotor against the centrifugal force generated when the Lundell type rotor rotates. Therefore the presence of the flange parts prevents the permanent magnets from being moved toward the outer diameter direction by the centrifugal force generated when the rotor rotates.

However, the conventional AC generator of the above structure has a drawback because no permanent magnet is placed between the flanges of the adjacent claw magnetic pole parts which are annularity arranged on the Lundell type rotor. Therefore the above structure of the conventional AC generator allows the leakage of magnet flux through the area between the adjacent flanges of the adjacent magnetic claw pole parts, and thereby decreases the amount of electric power of the AC generator. That is, the more the thickness of each of the flanges formed on the claw magnetic pole parts is decreased in the diameter direction (or radius direction) of the rotor, the more the anti-centrifugal strength of the flanges is decreased. In other words, a thin flange of the claw magnetic pole part has a weak anti-centrifugal strength.

SUMMARY OF THE INVENTION

It is an object of the present invention to provide an electric rotary machine for vehicles having flanges with improved anti-centrifugal strength placed between adjacent claw magnetic pole parts of pore cores in a Lundell type rotor. The electric rotary machine according to the present invention increases the output thereof such as the amount of electric power when the electric rotary machine is an AC generator for vehicles, and the output torque thereof when the electric rotary machine is an AC motor.

To achieve the above purposes, the present invention provides an electric rotary machine for vehicles. The electric rotary machine has a rotor and a stator. The rotor is composed mainly of a pair of pole cores and a plurality of permanent magnets. Each of the pole cores has a plurality of claw magnetic pole parts. Each of the permanent magnets is placed between a pair of the claw magnetic pole parts adjacent to each other. The stator core is placed in opposition to the rotor. In the electric rotary machine, a flange part is formed in a circumferential direction of the rotor to each of the claw magnetic pole parts of the pair of the pole cores to prevent the permanent magnets from moving toward an outer radius direction of the rotor. A thickness of the flange part decreases toward the outside from the bottom side of the flange.

This structure of the rotor allows the facing area of the flange parts between the adjacent claw magnetic pole parts to be decreased, and thereby decreases the leakage amount of magnetic flux between the adjacent flanges, and increases the output (such as the amount of electric power, and the output torque) of the electric rotary machine according to the present invention. Still further, because the thickness of each of the flange parts in the radius direction of the rotor is gradually increased from the front end part to the bottom part thereof, it is possible for the flange parts of the claw magnetic pole parts of the pole cores in the rotor to have an adequate strength (or an adequate anti-centrifugal strength) against centrifugal force generated in the permanent magnets towards the radius direction when the rotor rotates.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodi-

Embodiment

A description will be given of an electric rotary machine for a vehicle according to an embodiment of the present invention with reference to FIG. 1 to FIG. 7.

Figure 1:
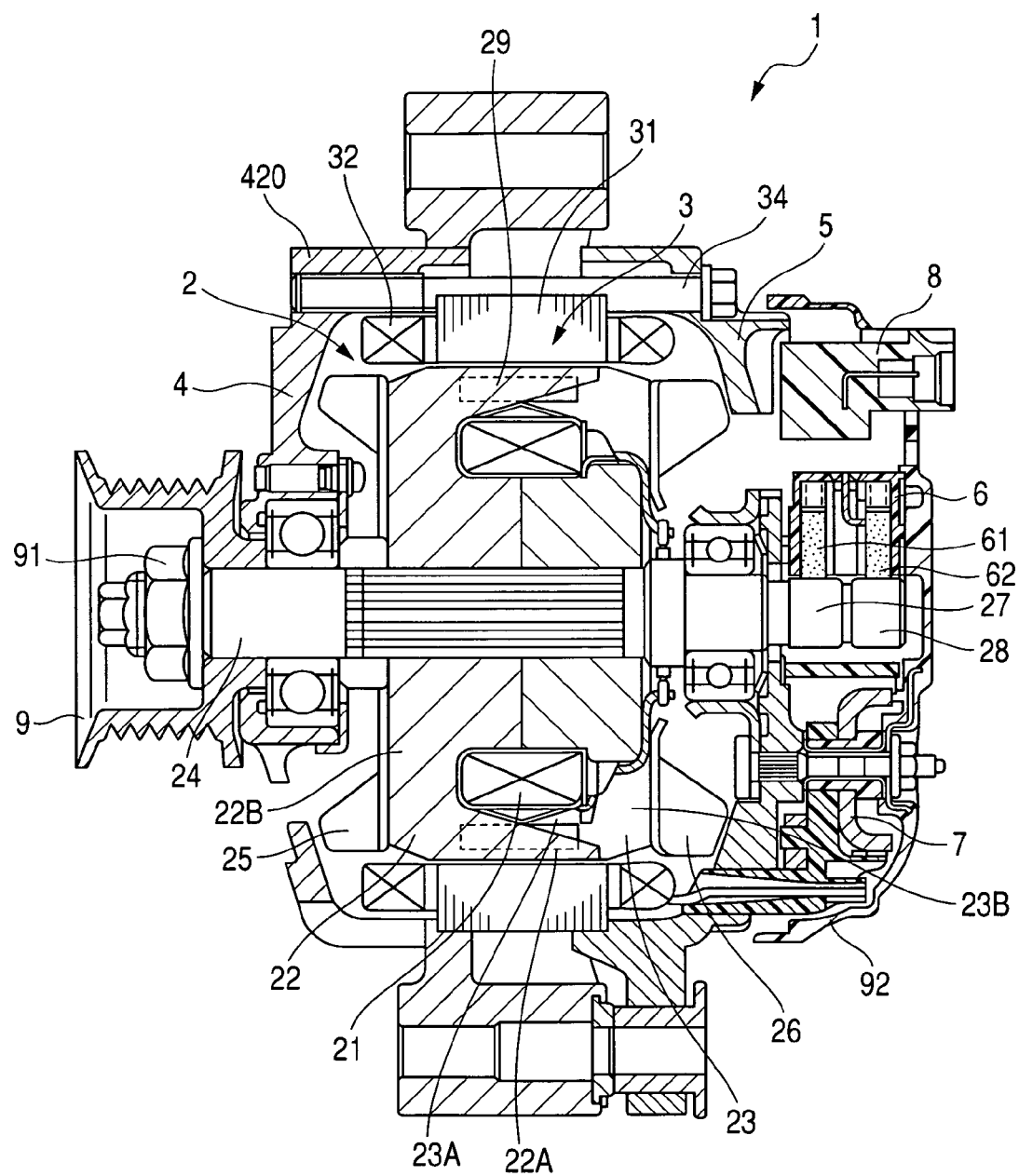
FIG. 1 is a diagram showing an entire structure of an alternate current (AC) generator as an electric rotary machine for a vehicle according to the embodiment of the present invention.

FIG. 1 is a diagram showing an entire structure of an AC generator as the electric rotary machine for a vehicle according to the embodiment of the present invention. As shown in FIG. 1, the AC generator 1 according to the embodiment is comprised of a Lundell type rotor 2 (or the "rotor 2" for short), a stator 3, a front side housing 4, a rear side housing 5, a brush assembly 6, a rectifier device 7, a voltage regulator unit 8, and a pulley 9.

The rotor 2 has a plurality of pole cores 22, 23, permanent magnets 29, exciting coils 21, and a rotary shaft 24. Each of the pole cores 22 and 23 has a claw magnetic pole which is bent toward the axial direction of the rotor 2. The claw magnetic pole parts of the pole cores 22 and 23 are alternately arranged along the rotational direction of the rotor 2 to form a north magnetic pole (N pole) and a south magnetic pole (S pole). Each of the permanent magnets 29 is placed between the adjacent claw magnetic pole parts of the pole cores 22 and 23 which face each other in the axial direction of the rotor 2. The exciting coil 21 is made of an insulated copper wire. The exciting coil 21 is wound in a concentric configuration to form a cylindrical shape in the rotor 2. Cooling fins 25 are fixed to the end surface in the axial direction of the pole core 22 in the front side (or the pulley 9 side) of the AC generator 1 by welding (for example, by a resistance projection welding). The cooling fins 25 have slant blades to introduce cooling air from the front side, and then to exhaust the cooling air toward the axial direction and the radial direction of the rotor 2. Thus, the cooling fins 25 are an axial type fan or a mixture of an axial and cyclone type fan.

Similarly, cooling fins 26 are fixed to the end surface in the axial direction of the pole core 23 in the rear side of the AC generator 1 by welding (for example, by a resistance projection welding). The cooling fins 26 introduces cooling air from the rear side and then exhaust the cooling air toward the axial direction of the rotor 2. The above cooling fin assembly supplies the cooling air to the permanent magnets 29 side of the rotor 2 in order to prevent the temperature increase of the permanent magnets 29. This can suppress deterioration of the magnetic characteristics and enhance the reliability of the permanent magnets 29 fixed to the rotor 2 by bonded member.

Slip rings 27 and 28 are fixed to the rear side of the rotary shaft 24. The slip rings 27 and 28 are electrically connected to both the ends of the exciting coil 21. The brush assembly 6 has brushes 61 and 62 which are forcedly contacted onto the slip rings 27 and 28. An exciting current flows from the rectifier device 7 to the exciting coils 21.

The stator 3 has a plurality of slots formed in a stator core 31. The stator core 31 faces the outer peripheral surface of the rotor 2. A three phase stator winding 32 is wound at predetermined intervals in the plurality of the slots. The rectifier device 7 rectifies an alternate current (AC) voltage induced in the three phase stator winding 32 and outputs a direct current (DC) voltage. The rectifier device 7 is placed at the opposed position to the pulley 9 through the rotor 2. The rectifier device 7 is comprised of a positive electrode side discharging plate and a negative electrode side discharging plate, and a plurality of rectifier elements. The positive electrode side discharging plate and the negative electrode side discharging plate are fixed at predetermined intervals. The rectifier elements are fixed with solder.

The front side housing 4 and the rear side housing 5 accommodate the rotor 2 and the stator 3. The rotor 2 is rotatably supported around the rotary shaft 24 in the front side housing 4 and the rear side housing 5. The stator 3 is placed on the outer surfaces of the pole cores 22 and 23 of the rotor 2 at a spacing of predetermined intervals. The stator 3 is fixed to four supporting parts 420 by bolts 34. The four supporting parts ate formed at predetermined regular intervals along the rotational direction of the rotor 2.

The voltage regulator unit 8 regulates the output voltage of the AC generator 1 by adjusting the exciting current flowing in the exciting coil 21. The voltage regulator unit 8 approximately maintains constant the output voltage of the AC generator 1 which is fluctuated by electric load and electric power generation amount.

The pulley 9 transmits the rotational power of the internal combustion engine (not shown) to the rotor 2 in the AC generator 1. The pulley 9 is fastened to one end (in the opposite side to the slip rings 27, 28) of the rotary shaft 24 by a nut 91. The rear cover 92 accommodates the brush assembly 6, the rectifier device 7, and the voltage regulator unit 8.

In the AC generator 1 having the above structure, the rotor 2 receives the rotational power transmitted from the internal combustion engine (not shown) through a belt (not shown) and the pulley 9, and thereby rotates. At this time, when an exciting voltage is applied into the exciting coil 21 in order to excite the claw magnetic pole parts of the pole cores 22 and 23, a three phase AC voltage is generated in the AC generator 1. The rectifier device 7 outputs a predetermined DC current.

Next, a description will now be given of a peripheral structure of the permanent magnets 29 placed in the claw magnet pole parts in the rotor 2 of the AC generator 1.

Figure 2:
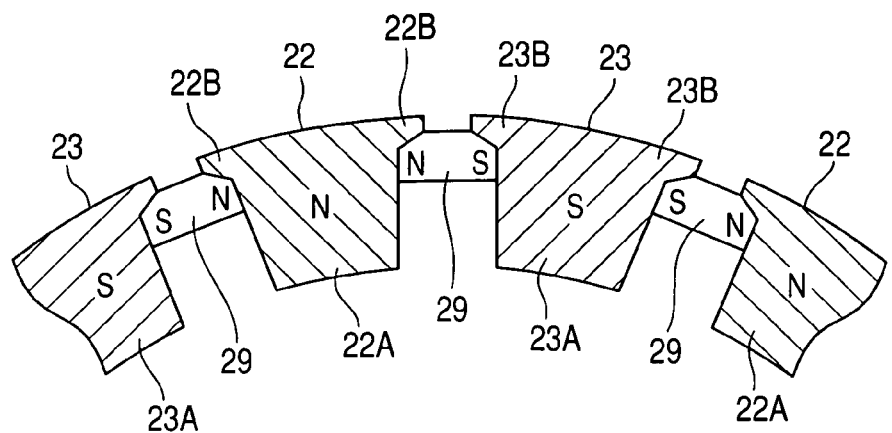
FIG. 2 is a diagram showing a cross section of a part of a Lundell type rotor in the AC generator shown in FIG. 1.
Figure 3:
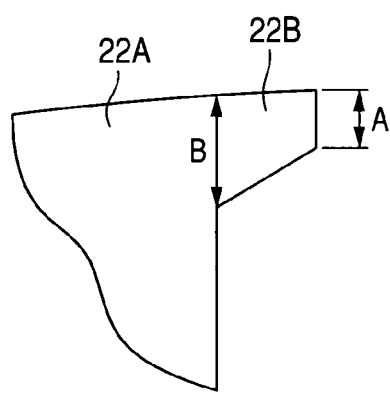
FIG. 3 is an enlarged diagram showing a flange part placed on a claw magnetic pole part in a pole core of the Lundell type rotor in the AC generator shown in FIG. 1.

FIG. 2 is a diagram showing a cross section of a part of the Lundell type rotor 2 in the AC generator 1 shown in FIG. 1. In other words, FIG. 2 shows a partial cross section of the rotor 2 in a vertical direction of the rotary shaft 24 at a facing surface of the pole cores 22 and 23. FIG. 3 is a diagram showing an enlarged flange part placed on the claw magnetic pole parts in the pole cores 22 and 23 shown in FIG. 2. Each of the permanent magnets 29 is placed between the claw magnet pole parts 22A and the 23A in a pair of the pole cores 22 and 23 in the direction to prevent leakage of magnetic flux. For example, when the exciting current flows in the exciting coil 21, and the claw magnetic pole part 22A of the pole core 22 becomes a north pole, and the other claw magnetic pole part 23A of the pole core 23 becomes a south pole, the side of the permanent magnet 29, which faces the claw magnetic pole 22A becomes a north pole and the other side thereof, which faces the claw magnetic pole part 23A becomes a south pole.

A flange part 22B is formed in the claw magnetic pole part 22A of the pole core 22, which projects from the outer peripheral edge of the claw magnetic pole part 22A toward the radius direction of the rotor 2 (toward the outer diameter side of the rotary shaft 24). The flange part 22B prevents the permanent magnet 29 from moving toward the outer diameter side of the rotor 2. Similarly, a flange part 23B is formed in the claw magnetic pole part 23B of the pole core 23, which projects from the outer peripheral edge of the claw magnetic pole part 23A toward the radius direction of the rotor 2. The flange part 23B prevents the permanent magnet 29 from moving toward the outer diameter side of the rotor 2.

The thickness of the flange part 22B in the diameter direction is gradually increased from the thickness A of the front side toward the thickness B of bottom side thereof, as shown in FIG. 3.

The outer peripheral surface (which faces the stator core 31) of the flange part 22B has a constant radius round the rotary shaft 24. This can keep a spacing of predetermined intervals between the stator core 31 and the flange part 22B. In the inner peripheral surface of the flange part 22B, the radius measured from the rotary shaft 24 at the flange part 22B is gradually decreased from the front end part to the bottom part of the of the flange part 22B. Each of the permanent magnets 29 has a shape to fit the inner peripheral surface of the flange parts 22B and 23B.

In structure of the AC generator 1 according to the embodiment, the radius thickness of the front end part is thinner than that of the bottom part of each of the flange parts 22B, 23B. That is, it is possible to decrease the area in which the flange parts 22B and 23B formed on a pair of the adjacent claw magnetic pole parts 22A and 23A, face to each other. This structure of the flange parts 22B, 23B prevents leakage of the magnetic flux between the flange parts 22B, 23B, and allows the AC generator 1 to increase the output amount of the electric power. Still further, because the radius thickness of each of the flange parts 22B, 23B is increased from the front end part to the bottom part thereof, it is possible for the flange parts 22B, 23B to maintain the anti-centrifugal strength against the centrifugal force of the permanent magnets 29 when the rotor 2 rotates.

Because the permanent magnet 29 has a profile in which the outer side in the radius direction of the permanent magnet 29 fits into the inner peripheral surface of the corresponding flange parts 22B, 23B of the claw magnetic pole parts 22A, 23A, it is possible for the entire inner surface of the flange parts 22B, 23B to receive the centrifugal force from the permanent magnet 29. This can prevent a part of the permanent magnet 29 from receiving an excess stress, and from breaking.

Still further, according to the embodiment of the present invention, the outer peripheral surface of each of the flange parts 22B, 23B has a same radius, and a spacing of predetermined intervals is formed between the stator core 31 and the flange parts 22B, 23B. This structure allows the magnetic flux between the claw magnetic pole parts 22A, 23A including the flange parts 22B, 23B and the stator 3. This structure also increases the output amount of electric power of the AC generator 1.

Still further, the radius measured to the inner peripheral surface of each of the flange parts 22B, 23B from the rotary shaft 24 side of the rotor 2 is gradually decreased from its front end part to its bottom part. This structure ensures the strength of each of the flange parts 22B, 23B increasing.

(Modifications)

The concept of the present invention is not limited by the above embodiment of the AC generator 1. It is possible to modify the structure of the claw magnetic pole parts and the flange parts in the rotor of the AC generator 1.

Figure 4:
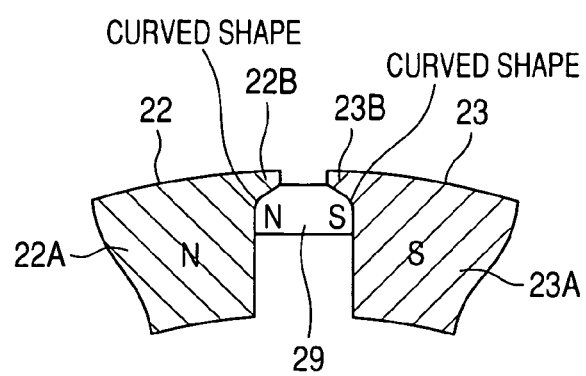
FIG. 4 is a diagram showing a modification of the flange parts formed on the claw magnetic pole parts in the pole cores of the Lundell type rotor in the AC generator shown in FIG. 1.

FIG. 4 is a diagram showing a modification of the flange parts formed in the claw magnetic pole parts in the pole cores of the Lundell type rotor in the AC generator 1 shown in FIG. 1. The structure of the flange parts shown in FIG. 4 is a modification of the structure of the flange part shown in FIG. 2.

As shown in FIG. 4, the bottom part of each of the flange parts 22B, 23B has a round shape or a curved shape. This structure allows that the inner peripheral surface of the flange parts 22B, 23N is smoothly fitted to the claw magnetic pole parts 22A, 23A.

Figure 5:
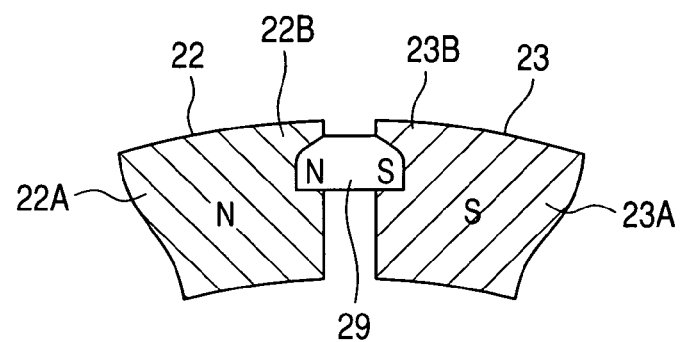
FIG. 5 is a diagram showing another modification of the claw magnetic pole parts in the pole cores of the Lundell type rotor in the AC generator shown in FIG. 1.

FIG. 5 is a diagram showing another modification of the claw magnetic pole parts in the pole cores of the Lundell type rotor in the AC generator shown in FIG. 1. The structure of the claw magnetic pole parts shown in FIG. 5 is a modification of the structure of the claw magnetic pole parts shown in FIG. 2. As shown in FIG. 5, each of the claw magnetic pole parts 22A, 23A has a concave part that corresponds to the outer peripheral shape in the circumferential direction of the permanent magnet 29. That is, a part of the permanent magnet 29 is accommodated in or fitted to the concave parts of the adjacent claw magnetic pole parts 22A and 23A of the pair of the pole cores 22 and 23. The structure of the claw magnetic pole parts shown in FIG. 5 allows the permanent magnets 29 to be fixed to the pole cores 22 and 23 regardless of the rotation of the rotor 2. Further, this structure shown in FIG. 5 makes it possible to easily assemble the permanent magnets 29 into the claw magnetic pole parts of the pole cores of the rotor 2 in the AC generator 1.

Figure 6:
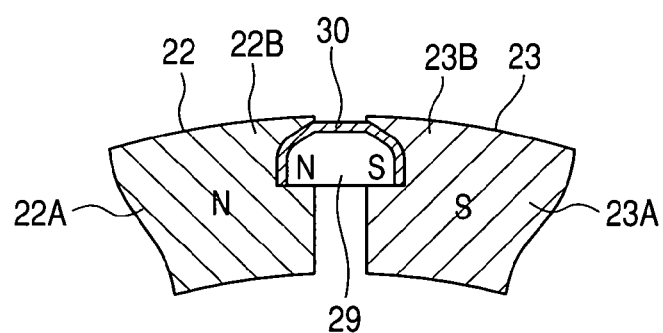
FIG. 6 is a diagram showing another modification of the permanent magnet placed between the adjacent claw magnetic pole parts in the pole cores of the Lundell type rotor in the AC generator shown in FIG. 1.

FIG. 6 is a diagram showing another modification of the permanent magnet placed between the adjacent claw magnetic pole parts in the pole cores of the Lundell type rotor in the AC generator shown in FIG. 1. The structure of the permanent magnets shown in FIG. 6 is a modification of the structure of the permanent magnets shown in FIG. 2. As shown in FIG. 6, at least a surface other than a bottom side surface in the outer surface of each of the permanent magnets 29 is covered with a covering member 30. The bottom side surface of the permanent magnet 29, which is not covered with the covering member, is faced with the rotary shaft side. The covering member 30 is made of non magnetic material. The presence of the covering member 30 can decrease the stress applied to the permanent magnets 29 during the rotation of the rotor 2. Further, the presence of the covering member 29 prevents fragments from being scattered when the permanent magnet 20 breaks. It is preferable to completely cover the entire outer surface of the permanent magnet 20 with the covering member 30. It is also possible to apply the covering member 30 to each of the structure of the rotor 2 shown in FIG. 2 and FIG. 4.

Figure 7:
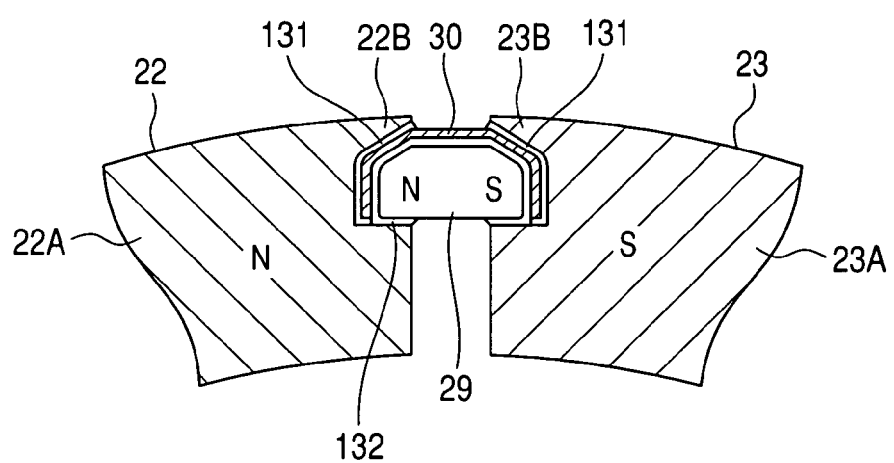
FIG. 7 is a diagram showing another modification of the flanges and the claw magnetic pole parts in the pole cores of the Lundell type rotor of the AC generator shown in FIG. 1.

FIG. 7 is a diagram showing another modification of the flanges and the claw magnetic pole parts in the pole cores of the Lundell type rotor of the AC generator shown in FIG. 1. The structure of the rotor shown in FIG. 7 is a modification of the structure of the rotor shown in FIG. 2. As shown in FIG. 7, the permanent magnet 29, the covering member 30, the claw magnetic pole parts 22, 23 including the flange part 22B, the flange part 23B are bonded by adhesive members 131, 132. The adhesive members 131, 132 are made of resin or rubber. It is also possible to bond a part of the entire surface of the permanent magnet 29, the covering member 30, the claw magnetic pole parts 22, 23 including the flange part 22B by adhesive members. In the structure of the rotor shown in FIG. 7, the adhesive members 131, 132 are added into the structure of the rotor shown in FIG. 6. It is also possible to add the adhesive members 131, 132 to the structure of each of the structures of the rotor shown in FIG. 2, FIG. 4, and FIG. 5. In those cases, the cooling fans 25, 26 provide cooling air to the adhesive members 131, 132 to decrease the temperature of the adhesive members 131, 132. This can increase the reliability of the rotor in the AC generator 1 according to the present invention.

In the embodiment and the modifications previously described, the concept of the present invention is applied to the AC generator 1. The present invention is not limited by the embodiment and the modifications previously described. For example, it is possible to apply the concept of the present invention to various types of electric rotary machines for vehicles, for example, to an electric rotary machine having both functions of generating electric power and providing output torque, or to an electric rotary machine providing output torque without generating electric power.

(Other Features and Effects of the Present Invention)

In the electric rotary machine as another aspect of the present invention, it is preferable that an outer surface of each of the permanent magnets has a shape to fit the inner peripheral surface of the flange part of each of the claw magnetic pole part. This structure allows that the entire surface of the permanent magnet contacted to the corresponding flange parts can receive the centrifugal force. That is, it is possible to avoid excess stress being applied to a part of the permanent magnet. This prevents the permanent magnets from being broken by such excess stress.

In the electric rotary machine as another aspect of the present invention, it is preferable that an outer peripheral surface of each of the flange parts has a constant radius measured from a central axis of a rotary shaft of the rotor. It is also preferable that a spacing of a predetermined interval is formed between a stator core of the stator and the flange parts of the claw magnetic pole parts of the rotor cores in the electric rotary machine. This structure allows the amount of magnetic flux between the stator and the claw magnetic pole parts including the flange parts. As a result, it is possible to increase the output torque of the electric rotary machine (when the electric rotary machine is an AC motor), and to increase the amount of electric power generated by the electric rotary machine (when the electric rotary machine is an AC generator).

In the electric rotary machine as another aspect of the present invention, it is preferable that a radius measured from the rotary shaft is gradually decreased from a front end part to a bottom part of the inner peripheral surface of each of the flange parts. This structure can increase the strength of the flange parts because of gradually increasing the thickness from the front end part to the bottom part of each of the flange parts.

In the electric rotary machine as another aspect of the present invention, it is preferable that each of the flange parts is smoothly connected at the bottom part thereof to the corresponding claw magnetic pole part. This structure decreases an excess stress to be applied to the bottom part of each of the flange parts. This structure can provide the flange parts formed in the claw magnetic pole parts in the pole cores of the rotor with the large anti-centrifugal strength against the centrifugal force of the permanent magnets when the electric rotary machine rotates.

In the electric rotary machine as another aspect of the present invention, it is preferable that each of the claw magnetic pole parts has a concave part with which the corresponding permanent magnet is fitted, and each of the permanent magnets is assembled to a pair of the adjacent pole cores through the concave parts of the claw magnetic pole cores of the adjacent pore cores. This structure provides improved and high reliability of supporting the permanent magnets during both cases, the rotating state and non-rotating state. This structure further provides easy assembling of the permanent magnets to the pole cores of the rotor in the electric rotary machine.

In the electric rotary machine as another aspect of the present invention, it is preferable that at least a surface other than a bottom side surface in an outer surface of each of the permanent magnets is covered with a covering member made of non-magnetic material, where the bottom side surface faces a rotary shaft side. This structure decreases the amount of stress to the permanent magnets by centrifugal force generated when the electric rotary machine rotates. This structure further prevents fragments of the permanent magnets from being scattered when the permanent magnet is broken into the fragments.

In the electric rotary machine as another aspect of the present invention, it is preferable that each of the permanent magnets and the claw magnetic pole parts are bonded by an adhesion member. It is also preferable that at least two of the permanent magnet, the covering member, and the claw magnetic pole part are bonded by an adhesion member. This structure further increases the reliability of supporting the permanent magnets by the pole cores of the rotor in the electric rotary machine.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An electric rotary machine for vehicles comprising:
a rotor comprising a pair of pole cores and a plurality of permanent magnets, the pole cores facing each other along an axial direction of the rotor, each of the pole cores having a plurality of claw magnetic pole parts, the claw magnetic pole parts in the pair of the pole cores being alternately arranged along the circumferential direction of the rotor, the adjacent claw magnetic pole parts, adjacently arranged along the circumferential direction of the rotor, having an opposite magnetic pole, and each of the permanent magnets being placed between the adjacent claw magnetic pole parts adjacently arranged along the circumferential direction of the rotor; and
a stator core placed in opposition to the rotor,
wherein:
a flange part is formed along a circumferential direction of the rotor at each of the adjacent claw magnetic pole parts to prevent the permanent magnets from moving toward the outside of the rotor, and a thickness of the flange part is increased from a front side to a bottom side of the flange part,
the front side of the flange part is close to a gap formed between the adjacent claw magnetic pole parts along the circumferential direction of the rotor,
a concave part is formed in a side of each of the flange parts in the circumferential direction, and each of the concave parts has a shape to which the corresponding permanent magnet is fitted, and each of the permanent magnets is assembled to the concave parts formed in the flange parts of the adjacent claw magnetic pole parts in the pair of the pole cores,
an outer surface of each of the permanent magnets has a shape to fit the inner peripheral surface of the flange part of each of the claw magnetic pole part,
a radius of each of the flange parts measured from a center part of the rotor is gradually decreased from a front end part to a bottom part of the inner peripheral surface of each of the flange parts,
the outer surface of each of the permanent magnets has:
a first side that extends in a first direction, a second side that opposes the first side and extends in a second direction, the first direction being substantially parallel to the second direction, a third side that extends in a third direction, and a fourth side that opposes the third side and extends in a fourth direction, the third direction intersecting the fourth direction, and the outer surface of each of the permanent magnets is defined by straight lines.

2. The electric rotary machine according to claim 1, wherein an outer peripheral surface of each of the flange parts has a constant radius measured from a central axis of a rotary shaft of the rotor.

3. The electric rotary machine according to claim 1, wherein a spacing of a predetermined interval is formed between a stator core of the stator and the flange parts of the claw magnetic pole parts of the rotor cores.

4. The electric rotary machine according to claim 1, wherein each of the flange parts is smoothly connected at the bottom part thereof to the corresponding claw magnetic pole part.

5. The electric rotary machine according to claim 1, wherein at least a surface other than a bottom side surface in an outer surface of each of the permanent magnets is covered with a covering member made of non-magnetic material, where the bottom side surface faces toward a rotary shaft side.

6. The electric rotary machine according to claim 5, wherein at least two of the permanent magnet, the covering member, and the claw magnetic pole part are bonded by an adhesion member.

7. The electric rotary machine according to claim 1, wherein each of the permanent magnets and the claw magnetic pole parts are bonded by an adhesion member.

* * * * *